(12) United States Patent
Kunikata et al.

(10) Patent No.: US 9,823,397 B2
(45) Date of Patent: Nov. 21, 2017

(54) POLARIZING PLATE AND METHOD OF PRODUCING POLARIZING PLATE

(71) Applicant: NITTO DENKO CORPORATION, Ibaraki-shi, Osaka (JP)

(72) Inventors: Satoru Kunikata, Ibaraki (JP); Shusaku Goto, Ibaraki (JP); Minoru Miyatake, Ibaraki (JP); Kentarou Yoshida, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 132 days.

(21) Appl. No.: 14/564,337

(22) Filed: Dec. 9, 2014

(65) Prior Publication Data

US 2015/0177434 A1 Jun. 25, 2015

(30) Foreign Application Priority Data

Dec. 25, 2013 (JP) .................................. 2013-266394
Dec. 25, 2013 (JP) .................................. 2013-266395

(51) Int. Cl.
 *B29C 65/48* (2006.01)
 *B32B 37/12* (2006.01)
 (Continued)

(52) U.S. Cl.
 CPC ............ *G02B 5/305* (2013.01); *B32B 37/025* (2013.01); *G02B 5/3033* (2013.01);
 (Continued)

(58) Field of Classification Search
 USPC ......... 156/247, 249, 278, 280, 307.1, 307.3, 156/307.5, 307.7
 See application file for complete search history.

(56) References Cited

U.S. PATENT DOCUMENTS 7,012,746 B2  3/2006  Bermel
7,048,823 B2  5/2006  Bermel
(Continued)

FOREIGN PATENT DOCUMENTS

CN  1459339 A  12/2003
CN  1668946 A  9/2005
(Continued)

OTHER PUBLICATIONS

Office Action dated Jan. 21, 2016, issued in counterpart Taiwanese Patent Application No. 103142007, with English translation. (14 pages).

(Continued)

*Primary Examiner* — Sing P Chan
(74) *Attorney, Agent, or Firm* — Westerman, Hattori, Daniels & Adrian, LLP (57) ABSTRACT

A method of producing a polarizing plate according to an embodiment includes: applying an application liquid containing a polyvinyl alcohol-based resin and a surfactant onto a resin substrate to produce a laminate in which a polyvinyl alcohol-based resin layer is formed on the resin substrate; stretching and dyeing the polyvinyl alcohol-based resin layer formed on the resin substrate to produce a polarizing film; laminating an optical functional film on a polarizing film side of the laminate to produce an optical functional film laminate; and peeling the resin substrate from the optical functional film laminate. A content of the surfactant in the application liquid is less than 1 part by weight with respect to 100 parts by weight of the polyvinyl alcohol-based resin.

7 Claims, 1 Drawing Sheet

(51) Int. Cl.
*B32B 37/14* (2006.01)
*B32B 38/10* (2006.01)
*C09J 5/00* (2006.01)
*G02B 5/30* (2006.01)
*B32B 37/00* (2006.01)
*B32B 38/00* (2006.01)
*B32B 37/24* (2006.01)
*B32B 38/16* (2006.01)

(52) U.S. Cl.
CPC . *B32B 2037/243* (2013.01); *B32B 2038/0028* (2013.01); *B32B 2038/168* (2013.01); *B32B 2309/105* (2013.01); *Y10T 428/31935* (2015.04)

(56) References Cited

U.S. PATENT DOCUMENTS

| | | | |
|---|---|---|---|
| 7,083,752 | B2 | 8/2006 | Bermel |
| 7,163,738 | B2 | 1/2007 | Bermel |
| 7,393,579 | B2 | 7/2008 | Bermel |
| 7,686,987 | B2 | 3/2010 | Bermel |
| 8,314,987 | B2 | 11/2012 | Goto et al. |
| 8,320,042 | B2 | 11/2012 | Goto et al. |
| 8,379,169 | B2 | 2/2013 | Kitagawa et al. |
| 8,411,360 | B2 | 4/2013 | Kitagawa et al. |
| 8,520,169 | B2 | 8/2013 | Kitagawa et al. |
| 8,520,171 | B2 | 8/2013 | Kitagawa et al. |
| 8,709,567 | B2 | 4/2014 | Kitagawa et al. |
| 8,721,816 | B2 | 5/2014 | Kitagawa et al. |
| 8,771,454 | B2 | 7/2014 | Goto et al. |
| 8,852,374 | B2 | 10/2014 | Goto et al. |
| 9,023,168 | B2 | 5/2015 | Kitagawa et al. |
| 9,283,740 | B2 | 3/2016 | Kitagawa et al. |
| 9,442,234 | B2 | 9/2016 | Kitagawa et al. |
| 9,442,235 | B2 | 9/2016 | Kitagawa et al. |
| 9,459,390 | B2 | 10/2016 | Kitagawa et al. |
| 2003/0214715 | A1 | 11/2003 | Bermel |
| 2003/0215581 | A1 | 11/2003 | Bermel |
| 2003/0215582 | A1 | 11/2003 | Bermel |
| 2003/0215583 | A1 | 11/2003 | Bermel |
| 2003/0215608 | A1 | 11/2003 | Bermel |
| 2003/0215621 | A1 | 11/2003 | Bermel |
| 2003/0215658 | A1 | 11/2003 | Bermel |
| 2005/0170156 | A1 | 8/2005 | Bermel |
| 2006/0127608 | A1 | 6/2006 | Bermel |
| 2006/0188708 | A1 | 8/2006 | Bermel |
| 2006/0238681 | A1* | 10/2006 | Murakami ........ G02F 1/133634 349/117 |
| 2012/0055607 | A1 | 3/2012 | Kitagawa et al. |
| 2012/0055608 | A1 | 3/2012 | Kitagawa et al. |
| 2012/0055621 | A1 | 3/2012 | Goto et al. |
| 2012/0055622 | A1 | 3/2012 | Kitagawa et al. |
| 2012/0055623 | A1 | 3/2012 | Kitagawa et al. |
| 2012/0056211 | A1 | 3/2012 | Kitagawa et al. |
| 2012/0056340 | A1 | 3/2012 | Kitagawa et al. |
| 2012/0057104 | A1 | 3/2012 | Kitagawa et al. |
| 2012/0057107 | A1 | 3/2012 | Kitagawa et al. |
| 2012/0057231 | A1 | 3/2012 | Goto et al. |
| 2012/0057232 | A1 | 3/2012 | Goto et al. |
| 2012/0058291 | A1 | 3/2012 | Kitagawa et al. |
| 2012/0058321 | A1 | 3/2012 | Goto et al. |
| 2013/0070186 | A1* | 3/2013 | Kunai ............. B29D 11/00644 349/96 |
| 2013/0100529 | A1 | 4/2013 | Kitagawa et al. |
| 2013/0114139 | A1 | 5/2013 | Kitagawa et al. |
| 2013/0149546 | A1 | 6/2013 | Mori et al. |
| 2013/0160938 | A1* | 6/2013 | Yasui ................. G02B 5/3025 156/246 |
| 2013/0329289 | A1 | 12/2013 | Haida et al. |
| 2014/0186568 | A1 | 7/2014 | Kitagawa et al. |
| 2015/0183199 | A1 | 7/2015 | Kitagawa et al. |
| 2016/0054494 | A1 | 2/2016 | Kitagawa et al. |
| 2016/0103258 | A1 | 4/2016 | Kitagawa et al. |
| 2016/0370502 | A1 | 12/2016 | Haida et al. |

FOREIGN PATENT DOCUMENTS

| | | |
|---|---|---|
| CN | 101619138 A | 1/2010 |
| CN | 102385087 A | 3/2012 |
| CN | 102834235 A | 12/2012 |
| CN | 103163583 A | 6/2013 |
| JP | 2000-338329 A | 12/2000 |
| JP | 2006249407 A | 9/2006 |
| JP | 2013-47853 A | 3/2013 |
| JP | 2013254067 A | 12/2013 |
| JP | 2015121719 A | 7/2015 |
| JP | 2015121720 A | 7/2015 |
| KR | 10-2010-0093075 A | 8/2010 |
| KR | 10-2013-0066529 A | 6/2013 |
| TW | 200941049 A | 10/2009 |

OTHER PUBLICATIONS

Office Action dated Sep. 26, 2016, issued in counterpart Chinese Application No. 201410822404.9, with English translation. (15 pages).

Office Action dated Feb. 11, 2016, issued in counterpart Korean Patent Application No. 2014-0187561, with English translation. (20 pages).

Office Action dated Jul. 5, 2017, issued in Japanese Patent Application No. 2013-266394 with translation.

Office Action dated Jul. 5, 2017, issued in Japanese Patent Application No. 2013-266395 with translation.

* cited by examiner

POLARIZING PLATE AND METHOD OF PRODUCING POLARIZING PLATE

This application claims priority under 35 U.S.C. Section 119 to Japanese Patent Application Nos. 2013-266394 and 2013-266395 both filed on Dec. 25, 2013, which are herein incorporated by reference.

BACKGROUND OF THE INVENTION

1. Field of the Invention

The present invention relates to a polarizing plate and a method of producing a polarizing plate.

2. Description of the Related Art

Polarizing films are placed on both sides of a liquid crystal cell of a liquid crystal display apparatus as a typical image display apparatus, the placement being attributable to an image-forming mode of the apparatus. For example, the following method has been proposed as a method of manufacturing the polarizing film (for example, Japanese Patent Application Laid-open No. 2000-338329). A laminate having a resin substrate and a polyvinyl alcohol (PVA)-based resin layer is stretched, and is then subjected to dyeing treatment so that the polarizing film may be formed on the resin substrate. According to such method, a polarizing film having a small thickness is obtained. Accordingly, the method has been attracting attention because of its potential to contribute to thinning of an image display apparatus in recent years.

The polarizing film can be utilized as, for example, a polarizing plate while maintaining the state of the laminate with the resin substrate. In addition, for example, a product obtained by attaching an optical functional film (such as a protective film) to the polarizing film side of the laminate and then peeling the resin substrate can be utilized as a polarizing plate. In the production of the polarizing film, adhesiveness between the resin substrate and the polyvinyl alcohol-based resin layer is preferably so high that floating or peeling does not occur therebetween at the time of treatment such as stretching or dyeing. However, when the adhesiveness between the resin substrate and the polyvinyl alcohol-based resin layer is high, peelability between the polarizing film to be obtained and the resin substrate reduces, and as a result, a peel direction, a peel angle, and the like upon peeling of the resin substrate and the polarizing film may be limited. Further, a polarizing plate using the polarizing film produced by using the resin substrate involves the following problem. A wrinkle, foreign matter, or the like is liable to occur, and hence the polarizing plate is poor in external appearance.

SUMMARY OF THE INVENTION

According to an embodiment of the present invention, there is provided a method of producing a polarizing plate by which a polarizing film can be produced without the occurrence of a problem such as peeling between a resin substrate and a polyvinyl alcohol-based resin layer, and after the production of the polarizing film, the polarizing film and the resin substrate can be peeled without limitations on a peel direction and a peel angle, and a polarizing plate excellent in external appearance can be obtained.

A method of producing a polarizing plate according to an embodiment of the present invention includes: applying an application liquid containing a polyvinyl alcohol-based resin and a surfactant onto a resin substrate to produce a laminate in which a polyvinyl alcohol-based resin layer is formed on the resin substrate; stretching and dyeing the polyvinyl alcohol-based resin layer formed on the resin substrate to produce a polarizing film; laminating an optical functional film on a polarizing film side of the laminate to produce an optical functional film laminate; and peeling the resin substrate from the optical functional film laminate. A content of the surfactant in the application liquid is less than 1 part by weight with respect to 100 parts by weight of the polyvinyl alcohol-based resin.

In one embodiment of the present invention, the content of the surfactant in the application liquid is 0.5 part by weight or less with respect to 100 parts by weight of the polyvinyl alcohol-based resin.

In one embodiment of the present invention, the stretching includes underwater stretching.

In one embodiment of the present invention, the surfactant includes a nonionic surfactant.

In one embodiment of the present invention, the polarizing film has a thickness of 10 μm or less.

In one embodiment of the present invention, the application liquid further contains acetoacetyl-modified polyvinyl alcohol.

In one embodiment of the present invention, a surface of the resin substrate onto which the application liquid is to be applied is subjected to corona treatment.

According to another aspect of the present invention, a polarizing plate is provided. The polarizing plate is obtained by the production method as described above.

According to still another aspect of the present invention, a laminate is provided. The laminate includes: a resin substrate; and a polyvinyl alcohol-based resin layer formed on one side of the resin substrate. The polyvinyl alcohol-based resin layer is formed by applying, onto the resin substrate, an application liquid containing a polyvinyl alcohol-based resin and less than 1 part by weight of a surfactant with respect to 100 parts by weight of the polyvinyl alcohol-based resin.

In one embodiment of the present invention, the application liquid contains 0.5 part by weight or less of the surfactant with respect to 100 parts by weight of the polyvinyl alcohol-based resin.

DETAILED DESCRIPTION OF THE PREFERRED EMBODIMENTS

Hereinafter, preferred embodiments of the present invention are described. However, the present invention is not limited to these embodiments.

Figure 1A:
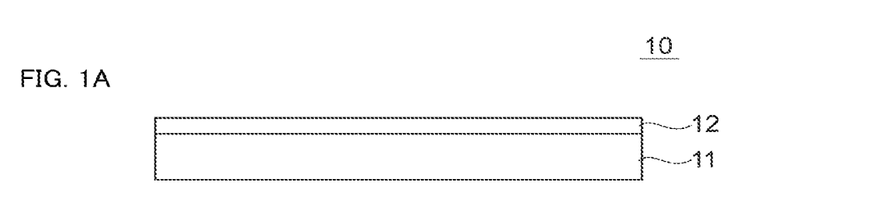
FIGS. 1A to 1D are schematic views illustrating a production method according to a preferred embodiment of the present invention.
Figure 1B:
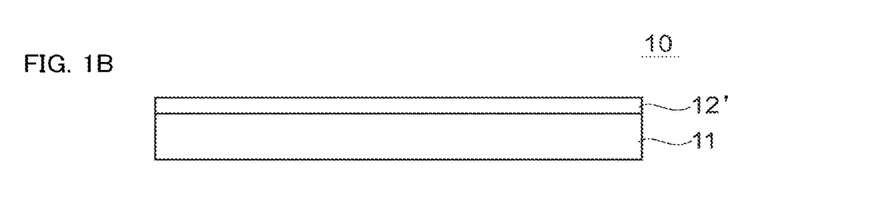
Figure 1C:
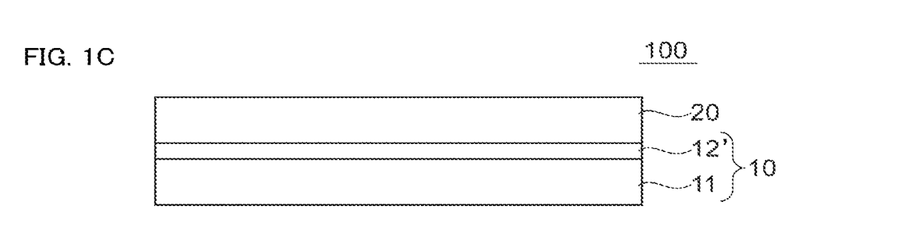
Figure 1D:
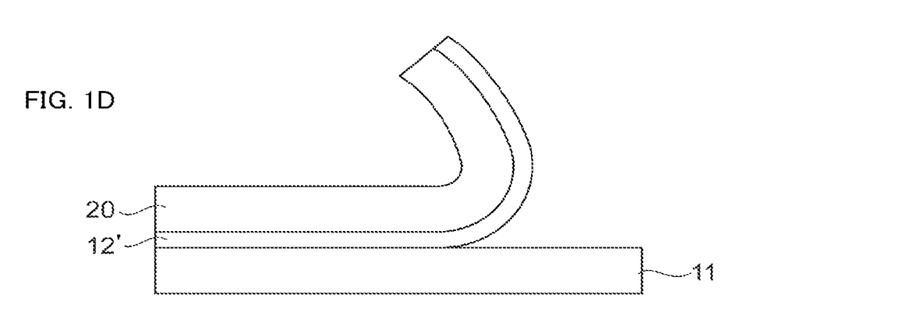

FIGS. 1A to 1D are schematic views illustrating a production method according to a preferred embodiment of the present invention. A method of producing a polarizing plate of the present invention includes the steps of: applying an application liquid containing a polyvinyl alcohol-based resin and a surfactant onto a resin substrate 11 to produce a laminate 10 in which a polyvinyl alcohol-based resin layer 12 is formed on the resin substrate 11 (FIG. 1A: laminate-producing step); stretching and dyeing the polyvinyl alcohol-based resin layer 12 formed on the resin substrate to produce a polarizing film 12' (FIG. 1B: polarizing film-producing step); laminating an optical functional film 20 on the polarizing film 12' side of the laminate 10 to produce an optical functional film laminate 100 (FIG. 1C: optical functional film laminate-producing step); and peeling the resin substrate 11 from the optical functional film laminate 100 (FIG. 1D: peeling step). The respective steps are described below.

[A. Laminate-Producing Step]

In the laminate-producing step, an application liquid containing a polyvinyl alcohol-based resin (hereinafter referred to as "PVA-based resin") and a surfactant is applied onto a resin substrate having a long shape to produce a laminate in which a PVA-based resin layer is formed on the resin substrate. The PVA-based resin layer is preferably formed by applying the application liquid containing the PVA-based resin and the surfactant onto one side of the resin substrate, and drying the liquid. As illustrated in FIG. 1A, the laminate 10 includes the resin substrate 11 and the PVA-based resin layer 12 formed on one side of the resin substrate 11.

As a formation material for the resin substrate, any appropriate thermoplastic resin may be adopted. Examples of the thermoplastic resin include: an ester-based resin such as a polyethylene terephthalate-based resin; a cycloolefin-based resin such as a norbornene-based resin; an olefin-based resin such as polypropylene; a polyamide-based resin; a polycarbonate-based resin; and a copolymer resin thereof. Of those, a norbornene-based resin and an amorphous polyethylene terephthalate-based resin are preferred.

In one embodiment, an amorphous (uncrystallized) polyethylene terephthalate-based resin is preferably used. In particular, a noncrystalline (hard-to-crystallize) polyethylene terephthalate-based resin is particularly preferably used. Specific examples of the noncrystalline polyethylene terephthalate-based resin include a copolymer further containing isophthalic acid as a dicarboxylic acid component and a copolymer further containing cyclohexane dimethanol as a glycol component.

When an underwater stretching mode is adopted in a stretching treatment to be described later, the resin substrate can absorb water and the water acts as like a plasticizer so that the substrate can plasticize. As a result, a stretching stress can be significantly reduced. Accordingly, the stretching can be performed at a high ratio and the stretchability of the resin substrate can be more excellent than that at the time of in-air stretching. As a result, a polarizing film having excellent optical characteristics can be produced. In one embodiment, the percentage of water absorption of the resin substrate is preferably 0.2% or more, more preferably 0.3% or more. Meanwhile, the percentage of water absorption of the resin substrate is preferably 3.0% or less, more preferably 1.0% or less. The use of such resin substrate can prevent, for example, the following inconvenience: the dimensional stability of the resin substrate remarkably reduces at the time of the production and hence the external appearance of the polarizing film to be obtained deteriorates. In addition, the use of such resin substrate can prevent the rupture of the substrate at the time of the underwater stretching and the peeling of the PVA-based resin layer from the resin substrate. It should be noted that the percentage of water absorption of the resin substrate can be adjusted by, for example, introducing a modification group into the constituent material. The percentage of water absorption is a value determined in conformity with JIS K 7209.

The glass transition temperature (Tg) of the resin substrate is preferably 170° C. or less. The use of such resin substrate can sufficiently secure the stretchability of the laminate while suppressing the crystallization of the PVA-based resin layer. Further, the glass transition temperature is more preferably 120° C. or less in consideration of the plasticization of the resin substrate by water and favorable performance of the underwater stretching. In one embodiment, the glass transition temperature of the resin substrate is preferably 60° C. or more. The use of such resin substrate prevents an inconvenience such as the deformation of the resin substrate (e.g., the occurrence of unevenness, a slack, or a wrinkle) during the application and drying of the application liquid containing the PVA-based resin and the surfactant, thereby enabling favorable production of the laminate. In addition, the use enables favorable stretching of the PVA-based resin layer at a suitable temperature (e.g., about 60° C.). In another embodiment, a glass transition temperature of less than 60° C. is permitted as long as the resin substrate does not deform during the application and drying of the application liquid containing the PVA-based resin and the surfactant. It should be noted that the glass transition temperature of the resin substrate can be adjusted by, for example, introducing a modification group into the formation material or heating the substrate constituted of a crystallization material. The glass transition temperature (Tg) is a value determined in conformity with JIS K 7121.

The thickness of the resin substrate before the stretching is preferably 20 μm to 300 μm, more preferably 50 μm to 200 μm. When the thickness is less than 20 μm, it may be difficult to form the PVA-based resin layer. When the thickness exceeds 300 μm, in, for example, underwater stretching, it may take a long time for the resin substrate to absorb water, and an excessively large load may be needed in the stretching.

Any appropriate resin can be adopted as the PVA-based resin for forming the PVA-based resin layer. Examples of the resin include a polyvinyl alcohol and an ethylene-vinyl alcohol copolymer. The polyvinyl alcohol is obtained by saponifying a polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin can be appropriately selected depending on purposes. The average polymerization degree is typically 1,000 to 10,000, preferably 1,200 to 5,000, more preferably 1,500 to 4,500. It should be noted that the average polymerization degree can be determined in conformity with JIS K 6726-1994.

The application liquid is typically a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. They may be used alone or in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the resin substrate can be formed.

As described above, the application liquid contains the surfactant in addition to the PVA-based resin. The surfactant may be of any one of the following types: a nonionic type, an anionic type, a cationic type, and an amphoteric type. Of those, a nonionic surfactant is preferably used. The nonionic surfactant has the following effect: even when the surfactant is eluted in a stretching bath, the surfactant hardly affects an ion balance in the bath. In addition, the nonionic surfactant has the following advantage: the surfactant comes in many choices that can be industrially used.

Any appropriate nonionic surfactant may be used as the nonionic surfactant. Specific examples of the nonionic surfactant include a glycerin fatty acid ester, a propylene glycol fatty acid ester, a sorbitan fatty acid ester, a sucrose fatty acid ester, a polyethylene glycol fatty acid ester, a polyoxyethylene alkyl ether, an alkyl glyceryl ether, a polyoxyethylene alkylphenyl ether, polyoxyethylene polyoxypropylene ether, a polyoxyalkylene alkyl ether, acetylene glycol, a polyoxyethylene sorbitan fatty acid ester, a polyoxyethylene sorbitol fatty acid ester, an alkyl glyceryl ether, a fatty acid alkylene oxide adduct, a polyoxyethylene hardened castor oil, a fatty acid alkanolamide, a fatty acid amide alkylene oxide adduct, an amine EO adduct, an amine PO adduct, and a diamine alkylene oxide adduct. Of those, a surfactant having a polyoxyalkylene group such as a polyoxyethylene group or a polyoxypropylene group and an acetylene glycol-based surfactant having an acetylene group in its center and having a symmetrical structure may be preferably used from the viewpoint of excellent compatibility with the PVA-based resin.

Any appropriate anionic surfactant may be used as the anionic surfactant. Specific examples of the anionic surfactant include: an alkali metal alkyl sulfate such as sodium dodecyl sulfate or potassium dodecyl sulfate; an ammonium alkyl sulfate such as ammonium dodecyl sulfate; sodium dodecyl polyglycol ether sulfate, sodium sulfonate, and an alkali metal salt of sulfonated paraffin; an alkylsulfonate such as an ammonium salt of sulfonated paraffin; an fatty acid salt such as sodium laurate, triethanolamine oleate, or triethanolamine abietate; an alkylarylsulfonate such as sodium dodecylbenzenesulfonate or an alkali metal sulfate of alkali phenol hydroxyethylene; a higher alkylnaphthalenesulfonic acid salt, a naphthalenesulfonic acid formalin condensate, a dialkylsulfosuccinic acid salt, a polyoxyethylene alkyl sulfate salt, and a polyoxyethylene alkyl aryl sulfate salt.

Any appropriate cationic surfactant may be used as the cationic surfactant. Specific examples of the cationic surfactant include an alkylpyridinyl chloride and an alkylammonium chloride.

Any appropriate amphoteric surfactant may be used as the amphoteric surfactant. Specific examples of the amphoteric surfactant include lauryl betaine, stearyl betaine, and lauryldimethylamine oxide.

The content of the surfactant in the application liquid is less than 1 part by weight, preferably 0.8 part by weight or less, more preferably 0.6 part by weight or less, still more preferably 0.5 part by weight or less, still further more preferably 0.4 part by weight or less with respect to 100 parts by weight of the PVA-based resin (when modified PVA to be described later is compounded, including the modified PVA). In addition, the content of the surfactant in the application liquid is, for example, 0.02 part by weight or more, preferably 0.03 part by weight or more with respect to 100 parts by weight of the PVA-based resin (when the modified PVA to be described later is compounded, including the modified PVA). When the content of the surfactant falls within the range, peelability between the resin substrate and the polarizing film can be improved while adhesiveness between the resin substrate and the PVA-based resin layer at the time of stretching to be described later (especially, underwater stretching) is maintained. Further, a PVA-based resin layer having high surface smoothness (resultantly, a polarizing film having high surface smoothness, and having an excellent transmittance and uniform optical characteristics) can be formed. In addition, the uniformity, dyeability, and stretchability of the PVA-based resin layer to be obtained can be improved.

The application liquid may be compounded with an additive. Examples of the additive include a plasticizer and a surfactant. Examples of the plasticizer include polyhydric alcohols such as ethylene glycol and glycerin. The plasticizer can be used for the purpose of additionally improving the uniformity, dyeing property, or stretchability of the PVA-based resin layer to be obtained. A further example of the additive is an easy-adhesion component. The use of the easy-adhesion component can improve adhesiveness between the resin substrate and the PVA-based resin layer. As a result, an inconvenience such as peeling of the PVA-based resin layer from the substrate is suppressed, and dyeing and underwater stretching to be described later can be favorably performed.

Examples of the easy-adhesion component include a modified PVA such as acetoacetyl modified PVA. A polymer having at least a repeating unit represented by the below-indicated general formula (I) is preferably used as the acetoacetyl modified PVA.

In the formula (I), the ratio of "n" to "l+m+n" (modification degree) is preferably 1% to 10%.

The saponification degree of the acetoacetyl modified PVA is preferably 97 mol % or more. In addition, the pH of a 4-wt % aqueous solution of the acetoacetyl modified PVA is preferably 3.5 to 5.5.

The modified PVA is added so that the amount of the modified PVA is preferably 3 wt % or more, more preferably 5 wt % or more with respect to the total weight of the PVA-based resins in the application liquid. On the other hand, the amount of the modified PVA added is preferably 30 wt % or less.

Any appropriate method may be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is preferably applied and dried at a temperature of 50° C. or more. A drying time is preferably from 1 second to 10 minutes.

The resin substrate may be subjected to surface treatment (such as corona treatment) before the formation of the PVA-based resin layer. Alternatively, an easy-adhesion layer may be formed on the resin substrate. Of those, the formation of an easy-adhesion layer (coating treatment) is preferably performed. For example, an acrylic resin or a polyvinyl alcohol-based resin is used as a material for forming the easy-adhesion layer. Of those, a polyvinyl alcohol-based resin is particularly preferred. Examples of the polyvinyl alcohol-based resin include a polyvinyl alcohol resin and a modified product thereof. Examples of the modified product of the polyvinyl alcohol resin include the acetoacetyl-modified PVA as described above. It should be noted that the thickness of the easy-adhesion layer is preferably about 0.05 to 1 μm. Such treatment can improve adhesiveness between the resin substrate and the PVA-based resin layer. As a result, for example, an inconvenience such as peeling of the PVA-based resin layer from the substrate is suppressed, and dyeing and underwater stretching to be described later can be satisfactorily performed.

The PVA-based resin layer formed as described above typically contains a PVA-based resin and less than 1 part by weight, preferably from 0.02 part by weight to 0.8 part by weight, more preferably from 0.02 part by weight to 0.6 part by weight, still more preferably from 0.02 part by weight to 0.5 part by weight, particularly preferably from 0.02 part by weight to 0.4 part by weight of a surfactant with respect to 100 parts by weight of the PVA-based resin. The thickness of the PVA-based resin layer (thickness before the stretching to be described later) is preferably from 3 μm to 40 μm, more preferably from 5 μm to 20 μm.

[B. Polarizing Film-Producing Step]

In the polarizing film-producing step, the PVA-based resin layer 12 formed on the resin substrate 11 is stretched and dyed to produce the polarizing film 12'.

B-1. Stretching

The stretching of the PVA-based resin layer is typically performed by stretching the laminate obtained in the laminate-producing step. Any appropriate method may be adopted as a method of stretching the laminate. Specifically, fixed-end stretching may be adopted or free-end stretching (such as a method involving passing the laminate through a gap between rolls having different peripheral speeds to uniaxially stretch the laminate) may be adopted. Of those, free-end stretching is preferred.

The stretching direction of the laminate may be appropriately set. In one embodiment, the laminate having a long shape is stretched in its lengthwise direction. In this case, there may be typically adopted a method involving passing the laminate between rolls having different peripheral speeds to stretch the laminate. In another embodiment, the laminate having a long shape is stretched in its widthwise direction. In this case, there may be typically adopted a method involving stretching the laminate using a tenter stretching apparatus.

A stretching mode is not particularly limited and may be an in-air stretching mode or an underwater stretching mode. Of those, an underwater stretching mode is preferred. According to the underwater stretching mode, the stretching can be performed at a temperature lower than the glass transition temperature (typically about 80° C.) of each of the resin substrate and the PVA-based resin layer, and hence the PVA-based resin layer can be stretched at a high ratio while its crystallization is suppressed. As a result, a polarizing film having excellent optical characteristics can be produced.

The stretching of the laminate may be performed in one stage, or may be performed in a plurality of stages. When the stretching is performed in a plurality of stages, for example, the free-end stretching and the fix-end stretching may be performed in combination, or the underwater stretching mode and the in-air stretching mode may be performed in combination. When the stretching is performed in a plurality of stages, the stretching ratio (maximum stretching ratio) of the laminate to be described later is the product of stretching ratios in the respective stages.

The stretching temperature of the laminate may be set to any appropriate value depending on, for example, a formation material for the resin substrate and the stretching mode. When the in-air stretching mode is adopted, the stretching temperature is preferably equal to or higher than the glass transition temperature (Tg) of the resin substrate, more preferably Tg+10° C. or more, particularly preferably Tg+15° C. or more. Meanwhile, the stretching temperature of the laminate is preferably 170° C. or less. Performing the stretching at such temperature suppresses rapid progress of the crystallization of the PVA-based resin, thereby enabling the suppression of an inconvenience due to the crystallization (such as the inhibition of the orientation of the PVA-based resin layer by the stretching).

When the underwater stretching mode is adopted as a stretching mode, the liquid temperature of a stretching bath is preferably 40° C. to 85° C., more preferably 50° C. to 85° C. At such temperature, the PVA-based resin layer can be stretched at a high ratio while its dissolution is suppressed. Specifically, as described above, the glass transition temperature (Tg) of the resin substrate is preferably 60° C. or more in relation to the formation of the PVA-based resin layer. In this case, when the stretching temperature falls short of 40° C., there is a possibility that the stretching cannot be satisfactorily performed even in consideration of the plasticization of the resin substrate by water. On the other hand, as the temperature of the stretching bath increases, the solubility of the PVA-based resin layer is raised and hence excellent optical characteristics may not be obtained. The laminate is preferably immersed in the stretching bath for a time of 15 seconds to 5 minutes.

When the underwater stretching mode is adopted, the laminate is preferably stretched while being immersed in an aqueous solution of boric acid (in-boric-acid-solution stretching). The use of the aqueous solution of boric acid as the stretching bath can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond. As a result, the PVA-based resin layer can be satisfactorily stretched with the aid of the rigidity and the water resistance imparted thereto, and hence a polarizing film having excellent optical characteristics can be produced.

The aqueous solution of boric acid is preferably obtained by dissolving boric acid and/or a borate in water as a solvent. The concentration of boric acid is preferably 1 part by weight to 10 parts by weight with respect to 100 parts by weight of water. Setting the concentration of boric acid to 1 part by weight or more can effectively suppress the dissolution of the PVA-based resin layer, thereby enabling the production of a polarizing film having additionally high characteristics. It should be noted that an aqueous solution obtained by dissolving a boron compound such as borax, glyoxal, glutaric aldehyde, or the like as well as boric acid or the borate in the solvent may also be used.

When the PVA-based resin layer has been caused to adsorb a dichromatic substance (typically iodine) in advance by dyeing to be described later, the stretching bath (aqueous solution of boric acid) is preferably compounded with an iodide. Compounding the bath with the iodide can suppress the elution of iodine that the PVA-based resin layer has been caused to adsorb. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The concentration of the iodide is preferably 0.05 part by weight to 15 parts by weight, more preferably 0.5 part by weight to 8 parts by weight with respect to 100 parts by weight of water.

The stretching ratio (maximum stretching ratio) of the laminate is preferably 5.0 times or more with respect to the original length of the laminate. Such high stretching ratio can be achieved by adopting, for example, the underwater stretching mode (in-boric-acid-solution stretching). It should be noted that the term "maximum stretching ratio" as used in this specification refers to a stretching ratio immediately before the rupture of the laminate. The stretching ratio at which the laminate ruptures is separately identified and a value lower than the value by 0.2 is the maximum stretching ratio.

In one embodiment, the laminate is subjected to in-air stretching at high temperature (e.g., 95° C. or more), and then subjected to the in-boric-acid-solution stretching, and dyeing to be described later. Such in-air stretching is hereinafter referred to as "preliminary in-air stretching" because the stretching can be ranked as stretching preliminary or auxiliary to the in-boric-acid-solution stretching.

When the preliminary in-air stretching is combined with the in-boric-acid-solution stretching, the laminate can be stretched at an additionally high ratio in some cases. As a result, a polarizing film having additionally excellent optical characteristics (such as a polarization degree) can be produced. For example, when a polyethylene terephthalate-based resin is used as the resin substrate, the resin substrate can be stretched satisfactorily, while its orientation is suppressed, by a combination of the preliminary in-air stretching and the in-boric-acid-solution stretching than that in the case of the in-boric-acid-solution stretching alone. As the orientation property of the resin substrate is raised, its stretching tension increases and hence it becomes difficult to stably stretch the substrate or the resin substrate ruptures. Accordingly, the laminate can be stretched at an additionally high ratio by stretching the resin substrate while suppressing its orientation.

In addition, when the preliminary in-air stretching is combined with the in-boric-acid-solution stretching, the orientation property of the PVA-based resin is improved and hence the orientation property of the PVA-based resin can be improved even after the in-boric-acid-solution stretching. Specifically, the orientation property of the PVA-based resin is improved in advance by the preliminary in-air stretching so that the PVA-based resin may easily cross-link with boric acid during the in-boric-acid-solution stretching. Then, the stretching is performed in a state where boric acid serves as a junction, and hence the orientation property of the PVA-based resin is assumed to be high even after the in-boric-acid-solution stretching. As a result, a polarizing film having excellent optical characteristics (such as a polarization degree) can be produced.

The stretching ratio in the preliminary in-air stretching is preferably 3.5 times or less. A stretching temperature in the preliminary in-air stretching is preferably equal to or higher than the glass transition temperature of the PVA-based resin. The stretching temperature is preferably 95° C. to 150° C. It should be noted that the maximum stretching ratio when the preliminary in-air stretching and the in-boric-acid-solution stretching are combined with each other is preferably 5.0 times or more, more preferably 5.5 times or more, still more preferably 6.0 times or more with respect to the original length of the laminate.

B-2. Dyeing

The dyeing of the PVA-based resin layer is typically performed by causing the PVA-based resin layer to adsorb a dichromatic substance (preferably iodine). A method for the adsorption is, for example, a method involving immersing the PVA-based resin layer (laminate) in a dyeing liquid containing iodine, a method involving applying the dyeing liquid to the PVA-based resin layer, or a method involving spraying the dyeing liquid on the PVA-based resin layer. Of those, a method involving immersing the laminate in the dyeing liquid is preferred. This is because iodine can satisfactorily adsorb to the layer.

The dyeing liquid is preferably an aqueous solution of iodine. The compounding amount of iodine is preferably 0.1 part by weight to 0.5 part by weight with respect to 100 parts by weight of water. The aqueous solution of iodine is preferably compounded with an iodide so that the solubility of iodine in water may be increased. Specific examples of the iodide are as described above. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably 20° C. to 50° C. so that the dissolution of the PVA-based resin may be suppressed. When the PVA-based resin layer is immersed in the dyeing liquid, an immersion time is preferably 5 seconds to 5 minutes so that the transmittance of the PVA-based resin layer may be secured. In addition, the dyeing conditions (the concentration, the liquid temperature, and the immersion time) can be set so that the polarization degree or single axis transmittance of the polarizing film to be finally obtained may fall within a predetermined range. In one embodiment, the immersion time is set so that the polarization degree of the polarizing film to be obtained may be 99.98% or more. In another embodiment, the immersion time is set so that the single axis transmittance of the polarizing film to be obtained may be 40% to 44%.

The dyeing treatment can be performed at any appropriate timing. When the underwater stretching is performed, the dyeing treatment is preferably performed before the underwater stretching.

B-3. Any Other Treatment

The laminate may be appropriately subjected to a treatment for forming the PVA-based resin layer into a polarizing film in addition to the stretching and dyeing. Examples of the treatment for forming the PVA-based resin layer into the polarizing film include an insolubilizing treatment, a cross-linking treatment, a washing treatment, and a drying treatment. It should be noted that the number of times, order, and the like of these treatments are not particularly limited.

The insolubilizing treatment is typically performed by immersing the PVA-based resin layer in an aqueous solution of boric acid. Water resistance can be imparted to the PVA-based resin layer by subjecting the layer to the insolubilizing treatment. The concentration of the aqueous solution of boric acid is preferably 1 part by weight to 4 parts by weight with respect to 100 parts by weight of water. The liquid temperature of an insolubilizing bath (the aqueous solution of boric acid) is preferably 20° C. to 50° C. The insolubilizing treatment is preferably performed before the underwater stretching treatment or the dyeing treatment.

The cross-linking treatment is typically performed by immersing the PVA-based resin layer in an aqueous solution of boric acid. Water resistance can be imparted to the PVA-based resin layer by subjecting the layer to the cross-linking treatment. The concentration of the aqueous solution of boric acid is preferably 1 part by weight to 5 parts by weight with respect to 100 parts by weight of water. In addition, when the cross-linking treatment is performed after the dyeing treatment, the solution is preferably further compounded with an iodide. Compounding the solution with the iodide can suppress the elution of iodine which the PVA-based resin layer has been caused to adsorb. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 60° C. The cross-linking treatment is preferably performed before the underwater stretching treatment. In a preferred embodiment, the dyeing treatment, the cross-linking treatment, and the underwater stretching treatment are performed in the stated order.

The washing treatment is typically performed by immersing the PVA-based resin layer in an aqueous solution of potassium iodide. The drying temperature in the drying treatment is preferably 30° C. to 100° C.

B-4. Polarizing Film

The polarizing film is substantially a PVA-based resin layer that adsorbs and orients a dichromatic substance. The thickness of the polarizing film is typically 25 µm or less, preferably 15 µm or less, more preferably 10 µm or less, still more preferably 7 µm or less, particularly preferably 5 µm or less. Meanwhile, the thickness of the polarizing film is preferably 0.5 µm or more, more preferably 1.5 µm or more. The polarizing film preferably shows absorption dichroism at any wavelength in the wavelength range of 380 nm to 780 nm. The single axis transmittance of the polarizing film is preferably 40.0% or more, more preferably 41.0% or more, still more preferably 42.0% or more, particularly preferably 43.0% or more. The polarization degree of the polarizing film is preferably 99.8% or more, more preferably 99.9% or more, still more preferably 99.95% or more.

[C. Optical Functional Film Laminate-Producing Step]

In the optical functional film laminate-producing step, the optical functional film 20 is laminated on the polarizing film 12' side of the laminate 10 to obtain the optical functional film laminate 100. An optical functional film having a long shape is typically laminated on the laminate having a long shape so that their lengthwise directions are aligned.

The optical functional film can function as, for example, a protective film for a polarizing film or a retardation film.

Any appropriate resin film may be adopted as the optical functional film. As a formation material for the optical functional film, there are given, for example: a cellulose-based resin such as triacetyl cellulose (TAC); a cycloolefin-based resin such as a norbornene-based resin; an olefin-based resin such as polyethylene or polypropylene; a polyester-based resin; and a (meth)acrylic resin. It should be noted that the term "(meth)acrylic resin" refers to an acrylic resin and/or a methacrylic resin.

The thickness of the optical functional film is typically from 10 µm to 100 µm, preferably from 20 µm to 60 µm. It should be noted that the optical functional film may be subjected to various surface treatments.

The modulus of elasticity of the optical functional film is preferably 2 GPa or more, more preferably from 2 GPa to 6 GPa. The peeling step to be described later can be performed more satisfactorily by using such optical functional film.

The lamination of the optical functional film is performed using any appropriate adhesive or pressure-sensitive adhesive. In a preferred embodiment, the adhesive is applied onto the surface of the polarizing film before the optical functional film is attached. The adhesive may be an aqueous adhesive, or may be a solvent-based adhesive. Of those, an aqueous adhesive is preferably used.

Any appropriate aqueous adhesive may be adopted as the aqueous adhesive. An aqueous adhesive containing a PVA-based resin is preferably used. The average polymerization degree of the PVA-based resin in the aqueous adhesive is preferably from about 100 to 5,000, more preferably from 1,000 to 4,000 in terms of adhesion. Its average saponification degree is preferably from about 85 mol % to 100 mol %, more preferably from 90 mol % to 100 mol % in terms of adhesion.

The PVA-based resin in the aqueous adhesive preferably contains an acetoacetyl group. This is because such resin can be excellent in adhesiveness between the PVA-based resin layer and the optical functional film, and in durability. The acetoacetyl group-containing PVA-based resin is obtained by, for example, causing a PVA-based resin and diketene to react with each other by any appropriate method. The acetoacetyl group modification degree of the acetoacetyl group-containing PVA-based resin is typically 0.1 mol % or more, preferably from about 0.1 mol % to 40 mol %, more preferably from 1 mol % to 20 mol %, particularly preferably from 2 mol % to 7 mol %. It should be noted that the acetoacetyl group modification degree is a value measured by NMR.

The resin concentration of the aqueous adhesive is preferably from 0.1 wt % to 15 wt %, more preferably from 0.5 wt % to 10 wt %.

The thickness of the adhesive at the time of the application may be set to any appropriate value. For example, the thickness is set so that an adhesive layer having a desired thickness may be obtained after heating (drying). The thickness of the adhesive layer is preferably from 10 nm to 300 nm, more preferably from 10 nm to 200 nm, particularly preferably from 20 nm to 150 nm.

Heating is preferably performed after the lamination of the optical functional film. A temperature for the heating is preferably 50° C. or more, more preferably 55° C. or more, still more preferably 60° C. or more, particularly preferably 80° C. or more. It should be noted that the heating performed after the lamination of the optical functional film may also serve as the drying treatment of the laminate. In addition, the heating may be performed after the peeling step to be described later, but is preferably performed before the peeling step.

[D. Peeling Step]

In the peeling step, the resin substrate 11 is peeled from the optical functional film laminate 100. A conventional optical functional film laminate is poor in peelability between its polarizing film and resin substrate, and hence a peel direction, a peel angle, and the like upon peeling of the film and the substrate are limited. In contrast, in the present invention, compounding the PVA-based resin layer with a predetermined amount of the surfactant can improve peelability between the polarizing film to be obtained and the resin substrate. As a result, the film and the substrate can be peeled without limitations on a peel direction, a peel angle, and the like. It is preferred that the resin substrate 11 be peeled from the optical functional film laminate 100 by pulling the polarizing film 12' and the optical functional film 20 upward at a desired angle while horizontally retaining the optical functional film laminate 100, or conveying the laminate in a horizontal direction, so that the resin substrate 11 may be on a lower side. Alternatively, the resin substrate 11 is peeled from the optical functional film laminate 100 by pulling the polarizing film 12' and the optical functional film 20 downward at a desired angle while horizontally retaining the optical functional film laminate 100, or conveying the laminate in the horizontal direction, so that the resin substrate 11 may be on an upper side.

A tension (peel tension) needed for the peeling is preferably 0.5 N/mm or less, more preferably 0.3 N/mm or less, particularly preferably 0.1 N/mm or less.

In the peeling step, peeling auxiliary means may be placed on the optical functional film side of the optical functional film laminate in order that the peeling may be performed more easily, more satisfactorily, and more stably. Examples of the peeling auxiliary means include a peeling roll and a peeling bar. The peeling roll is brought into abutment with the optical functional film side of the optical functional film laminate and the roll itself aids the peeling while rotating. When the peeling bar is used, the peeling bar typically has a tip portion whose section is of a semicircular shape, the tip portion is brought into abutment with the optical functional film side of the optical functional film laminate, and the bar aids the peeling without rotating. At this time, a surface protective film may be laminated on a surface of the optical functional film laminate on the optical functional film side in order that a flaw may be prevented from occurring owing to the peeling roll or the peeling bar. Although the surface protective film is not particularly limited, a typical example thereof is a polyethylene-based film having a pressure-sensitive adhesive layer on its surface, and the film can be attached to the surface of the optical functional film by the pressure-sensitive adhesive layer.

EXAMPLES

Hereinafter, the present invention is specifically described byway of Examples. However, the present invention is not limited to these Examples. It should be noted that methods of measuring the respective characteristics are as described below.

1. Thickness

Measurement was performed with a digital micrometer (manufactured by ANRITSU CORPORATION, product name: "KC-351C").

2. Glass Transition Temperature (Tg)

Measurement was performed in conformity with JIS K 7121.

Example 1

An amorphous polyethylene terephthalate film having a long shape (manufactured by Mitsubishi Plastics, Inc., trade name "NOVACLEAR SH046", Tg: 70° C., thickness: 200 μm) was stretched in an oven at 90° C. with a tenter in its widthwise direction at a stretching ratio of 2 times to provide a resin substrate.

One surface of the resin substrate was subjected to corona treatment (treatment condition: 55 W·min/m$^2$). An aqueous solution for forming a PVA-based resin layer (PVA concentration: 7%) containing 90 parts by weight of polyvinyl alcohol (polymerization degree: 4,200, saponification degree: 99.2 mol %), 10 parts byweight of acetoacetyl-modified PVA (polymerization degree: 1,200, acetoacetyl modification degree: 4.6%, saponification degree: 99.0 mol % or more, manufactured by The Nippon Synthetic Chemical Industry Co., Ltd., trade name "GOHSEFIMER Z200"), and 0.07 part by weight of polyoxyalkylene alkyl ether (manufactured by Kao Corporation, trade name "EMULGEN MS110") as a nonionic surfactant was applied onto the corona-treated surface, and was dried at from 60° C. to 70° C. for 5 minutes to form a PVA-based resin layer having a thickness of 10 μm. Thus, a laminate was obtained.

The resultant laminate was subjected to free-end uniaxial stretching in its longitudinal direction (lengthwise direction) at 2 times in an oven at 100° C. between rolls having different peripheral speeds (preliminary in-air stretching).

Next, the laminate was immersed in an insolubilizing bath having a liquid temperature of 30° C. (an aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. (an aqueous solution of iodine obtained by compounding 100 parts by weight of water with 0.2 part by weight of iodine and 1.0 part by weight of potassium iodide) for 60 seconds (dyeing treatment).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (cross-linking treatment).

After that, the laminate was uniaxially stretched in its longitudinal direction (lengthwise direction) between rolls having different peripheral speeds while being immersed in an aqueous solution of boric acid having a liquid temperature of 70° C. (an aqueous solution obtained by compounding 100 parts by weight of water with 4 parts by weight of boric acid and 5 parts by weight of potassium iodide) (underwater stretching). In this case, the laminate was stretched immediately before its rupture (the maximum stretching ratio was 6.0 times).

After that, the laminate was immersed in a washing bath having a liquid temperature of 30° C. (an aqueous solution obtained by compounding 100 parts by weight of water with 4 parts by weight of potassium iodide) (washing treatment).

Subsequently, an aqueous solution of a PVA-based resin (manufactured by The Nippon Synthetic Chemical Industry Co., Ltd., trade name: "GOHSEFIMER (trademark) Z-200," resin concentration: 3 wt %) was applied onto the surface of the PVA-based resin layer of the laminate. A triacetyl cellulose film having a modulus of elasticity of 4.0 GPa (manufactured by Konica Minolta, Inc., trade name: "KC4UY," thickness: 40 μm) was attached to the resultant, and the whole was heated in an oven maintained at 60° C. for 5 minutes, thereby producing an optical functional film laminate having a polarizing film with a thickness of 5 μm.

The resultant optical functional film laminate was mounted on a flat table so that its resin substrate was on a lower side, and then peeling was performed while changing an angle and a direction in a state where end portions of the PVA-based resin layer (polarizing film) and the triacetyl cellulose film were held. Thus, a polarizing plate was obtained.

Example 2

A polarizing plate was obtained in the same manner as in Example 1 except that an aqueous solution for forming a PVA-based resin layer was prepared by using an acetylene glycol-based surfactant (manufactured by Nisshin Chemical Industry Co., Ltd., trade name "OLFINE EXP4123") as a nonionic surfactant.

Example 3

A polarizing plate was obtained in the same manner as in Example 1 except that an aqueous solution for forming a PVA-based resin layer was prepared by: using an acetylene glycol-based surfactant (manufactured by Nisshin Chemical Industry Co., Ltd., trade name "OLFINE EXP4123") as a nonionic surfactant; and setting its compounding amount to 0.5 part by weight.

Example 4

A polarizing plate was obtained in the same manner as in Example 1 except that an aqueous solution for forming a PVA-based resin layer was prepared by changing the compounding amount of the nonionic surfactant to 0.5 part by weight.

Example 5

A polarizing plate was obtained in the same manner as in Example 1 except that an aqueous solution for forming a PVA-based resin layer was prepared by: using an acetylene glycol-based surfactant (manufactured by Nisshin Chemical Industry Co., Ltd., trade name "OLFINE EXP4123") as a nonionic surfactant; and setting its compounding amount to 0.7 part by weight.

Comparative Example 1

A polarizing plate was obtained in the same manner as in Example 1 except that an aqueous solution for forming a PVA-based resin layer was prepared without the use of any nonionic surfactant.

Comparative Example 2

A polarizing plate was obtained in the same manner as in Example 1 except that an aqueous solution for forming a PVA-based resin layer was prepared by changing the compounding amount of the nonionic surfactant to 1.0 part by weight. It should be noted that in Comparative Example 2, peeling occurred between the resin substrate and the PVA-based resin layer at the time of the underwater stretching.

In each of Examples and Comparative Examples, the state of the laminate after the underwater stretching was visually evaluated. Further, an evaluation for peelability in the peeling step of each of Examples and Comparative Examples was performed on the basis of the below-indicated evaluation criteria. In addition, the resultant polarizing film was visually observed and evaluated for its surface smoothness on the basis of the below-indicated evaluation criteria. Table 1 shows the results of the evaluations.

(Evaluation Criteria for State of Laminate)
Good: Floating or peeling was not observed between the resin substrate and the PVA-based resin layer.
Bad: Floating or peeling was observed between the resin substrate and the PVA-based resin layer.
(Evaluation Criteria for Peelability)
Good: The polarizing film and the resin substrate were able to be continuously peeled at an interface therebetween without limitations on a peel angle and a peel direction.
Bad: When the polarizing film and the resin substrate were peeled at a peel angle of less than 90°, the rupture of the polarizing film or the cohesive failure of the resin substrate occurred, and hence it was difficult to continuously peel the polarizing film and the resin substrate.
(Evaluation Criteria for Surface Smoothness)
Good: The edge of a reflected image appears to be linear when observed by reflecting light from a fluorescent lamp.
Bad: The edge of a reflected image appears to be distorted when observed by reflecting light from a fluorescent lamp.

TABLE 1

|  | Surfactant | | State of laminate after underwater stretching | Peelability | Surface smoothness |
|---|---|---|---|---|---|
|  | Kind | Compounding amount with respect to 100 parts by weight of PVA-based resin (part(s) by weight) |  |  |  |
| Example 1 | EMULGEN MS110 | 0.07 | Good | Good | Good |
| Example 2 | OLFINE EXP4123 | 0.07 | Good | Good | Good |
| Example 3 | OLFINE EXP4123 | 0.5 | Good | Good | Good |
| Example 4 | EMULGEN MS110 | 0.5 | Good | Good | Good |
| Example 5 | OLFINE EXP4123 | 0.7 | Good | Good | Bad |
| Comparative Example 1 | — | 0 | Good | Bad | Good |
| Comparative Example 2 | EMULGEN MS110 | 1.0 | Bad | Good | Bad |

As is apparent from Table 1, according to the method of producing a polarizing plate of the present invention, the surface smoothness of the polarizing film, and the peelability between the polarizing film and the resin substrate can both be achieved by compounding the PVA-based resin layer with the surfactant and specifying its compounding amount. Specifically, the polarizing film can be produced without the occurrence of a problem such as peeling between the resin substrate and the PVA-based resin layer, and after the production of the polarizing film, the polarizing film and the resin substrate can be easily peeled without limitations on a peel direction and a peel angle. Further, according to the production method of the present invention, a wrinkle or foreign matter can be prevented from occurring on the polarizing film in the peeling step while the surface smoothness is maintained. Therefore, according to the production method of the present invention, a polarizing plate having high quality and an excellent external appearance can be obtained with excellent production efficiency.

According to the production method of the present invention, the polyvinyl alcohol-based resin layer contains a predetermined amount of the surfactant, and hence the polarizing film can be produced without the occurrence of a problem such as peeling between the resin substrate and the polyvinyl alcohol-based resin layer, and after the production of the polarizing film, the polarizing film and the resin substrate can be peeled without limitations on a peel direction and a peel angle, and a polarizing plate excellent in external appearance can be obtained. More specifically, according to the production method of the present invention, the polarizing film and the resin substrate can be satisfactorily peeled while the occurrence of a wrinkle, foreign matter (such as a substrate residue), or the like is suppressed. At that time, when the content of the surfactant is set to be equal to or less than the predetermined amount, the surface smoothness of the polarizing film can be improved. As a result, a polarizing plate extremely excellent in external appearance can be obtained.

The polarizing plate of the present invention is suitably used for liquid crystal panels of, for example, liquid crystal televisions, liquid crystal displays, cellular phones, digital cameras, video cameras, portable game machines, car navigation systems, copying machines, printers, facsimile machines, clocks, and microwave ovens. The polarizing plate of the present invention is also suitably used as an antireflection film for an organic EL device.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A method of producing a polarizing plate, comprising:
    applying an application liquid containing a polyvinyl alcohol-based resin and a surfactant onto a resin substrate to produce a laminate in which a polyvinyl alcohol-based resin layer is formed on the resin substrate;
    stretching and dyeing the polyvinyl alcohol-based resin layer formed on the resin substrate to produce a polarizing film;
    laminating an optical functional film on a polarizing film side of the laminate to produce an optical functional film laminate; and
    peeling the resin substrate from the optical functional film laminate,
    wherein a content of the surfactant in the application liquid is less than 1 part by weight and equal to or more than 0.02. part by weight with respect to 100 parts by weight of the polyvinyl alcohol-based resin.

2. A method of producing a polarizing plate according to claim 1, wherein the content of the surfactant in the application liquid is 0.5 part by weight or less with respect to 100 parts by weight of the polyvinyl alcohol-based resin.

3. A method of producing a polarizing plate according to claim 1, wherein the stretching includes underwater stretching.

4. A method of producing a polarizing plate according to claim 1, wherein the surfactant comprises a nonionic surfactant.

5. A method of producing a polarizing plate according to claim 1, wherein the polarizing film has a thickness of 10 μm or less.

6. A method of producing a polarizing plate according to claim 1, wherein the application liquid further contains acetoacetyl-modified polyvinyl alcohol.

7. A method of producing a polarizing plate according to claim 1, wherein a surface of the resin substrate onto which the application liquid is to be applied is subjected to corona treatment.

* * * * *